United States Patent
Sato

(10) Patent No.: US 9,703,069 B2
(45) Date of Patent: Jul. 11, 2017

(54) MOUNTING FIXTURE OF ELASTIC SEAL MEMBER

(71) Applicant: FANUC CORPORATION, Minamitsuru-gun, Yamanashi (JP)

(72) Inventor: Takanori Sato, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 14/884,160

(22) Filed: Oct. 15, 2015

(65) Prior Publication Data

US 2016/0109683 A1    Apr. 21, 2016

(30) Foreign Application Priority Data

Oct. 16, 2014  (JP) ................. 2014-211764

(51) Int. Cl.
| | | |
|---|---|---|
| G02B 7/182 | (2006.01) | |
| F16J 15/02 | (2006.01) | |
| F16J 15/10 | (2006.01) | |
| B25B 27/00 | (2006.01) | |

(52) U.S. Cl.
CPC .......... *G02B 7/182* (2013.01); *B25B 27/0028* (2013.01); *F16J 15/021* (2013.01); *F16J 15/10* (2013.01)

(58) Field of Classification Search
CPC ........ G02B 7/1822; G02B 7/182; G02B 7/00; B25B 27/0028; F16J 15/021; F16J 15/10
USPC ........................................... 359/871
See application file for complete search history.

(56) References Cited

FOREIGN PATENT DOCUMENTS

| | | | |
|---|---|---|---|
| CN | 101403118 | | 4/2009 |
| CN | 201872129 | | 6/2011 |
| CN | 201893534 | | 7/2011 |
| CN | 203409479 | | 1/2014 |
| CN | 204267925 | | 4/2015 |
| JP | 63205976 A | * | 8/1988 |
| JP | S63-229780 A | | 9/1988 |
| JP | 11218718 | | 8/1999 |
| JP | 2004248770 | | 9/2004 |
| JP | 2010124072 | | 6/2010 |

OTHER PUBLICATIONS

Chinese Office Action with English language translation for Application No. 201510662248.9, dated Oct. 27, 2016, 8 pages.

* cited by examiner

*Primary Examiner* — Jade R Chwasz
(74) *Attorney, Agent, or Firm* — RatnerPrestia

(57) ABSTRACT

A mounting fixture used for mounting a ring-shaped elastic seal member between a ring-shaped side surface of an optical component and a holder which holds the optical component. The mounting fixture has a first abutting surface which can abut against a top surface of the optical component which intersects the side surface, a projecting part which is arranged so as to surround the first abutting surface and which projects out from the first abutting surface in a direction vertical to the first abutting surface, and a second abutting surface which is provided at the front end of the projecting part and can abut against the elastic seal member.

7 Claims, 9 Drawing Sheets

MOUNTING FIXTURE OF ELASTIC SEAL MEMBER

BACKGROUND OF THE INVENTION

1. Field of the Invention

The present invention relates to a mounting fixture which is used for mounting a ring-shaped elastic seal member on a peripheral surface of an optical component such as a partial reflecting mirror or full reflecting mirror.

2. Description of the Related Art

A laser oscillator used for cutting, welding, and otherwise processing metal is provided with various optical components such as partial reflecting mirrors and full reflecting mirrors. Usually, these optical components are built into the laser oscillator while mounted on dedicated holders. Further, in order to secure the vacuum state or air-tight state around the optical components and to prevent the optical components from being subjected to mechanical stress, the optical components are mounted on holders through elastic seal members such as O-rings or gaskets. In particular, in gas laser oscillators, O-rings for securing the air-tightness of the flow paths of the gas are mounted on the side surfaces of the optical components such as partial reflecting mirrors and full reflecting mirrors. The seal structure of such an optical component is illustrated in JP S63-229780A. Similarly, in a processing head of a laser processing machine, an O-ring or gasket for cutting off the assist gas is mounted on the side surface of the optical component.

Incidentally, when an optical component of a laser oscillator or laser processing machine is detached for cleaning or replacement, it is necessary to proceed with mounting the cleaned optical component or new optical component again on the holder. Such mounting of the optical component includes mounting the elastic seal members such as O-rings or gaskets on the side surface of the optical component again. FIG. 14 to FIG. 18 are schematic views which show by time series the procedure in the mounting work of an optical component in a conventional $CO_2$ gas laser.

In FIG. 14, the holder (mirror holder 7) for holding an optical component (mirror 6) is detached from a resonator. In the state of FIG. 14, a large diameter O-ring 8 is located between a side surface 61 of the mirror 6 and a circumferential wall part 72 of the mirror holder 7, while a small diameter O-ring 9 is located between the bottom surface 63 of the mirror 6 and a support part 71 of the mirror holder 7. These O-rings 8 and 9 not only perform the function of maintaining the vacuum state of the resonator, but also the function of positioning the mirror 6 at the center of the mirror holder 7. Next, in FIG. 15, the mirror 6 is detached from the mirror holder 7 to be placed on a flat mirror table T. After the mirror 6 is brought into the state of FIG. 15, the cleaning operation of the bottom surface 63 of the mirror 6 is started. At the end of the cleaning operation, cleaning paper CP is used to wipe the bottom surface 63 to finish it up. Next, in FIG. 16, the mirror 6 is again placed on the mirror holder 7. In the state of FIG. 16, the small diameter O-ring 9 is mounted in advance between the bottom surface 62 of the mirror and the support part 71 of the mirror holder 7.

Next, FIG. 17 shows the intermediate state where a large diameter O-ring 8 is mounted between the mirror 6 and the mirror holder 7. As shown in FIG. 17, in the mounting work according to this example, the worker uses his fingers to press the O-ring 8 downward so as to mount the O-ring 8 between the side surface 61 of the mirror 6 and the circumferential wall part 72 of the mirror holder 7. During this step,

[Column 2]

the worker preferably uses the fingers of his two hands to uniformly press a plurality of locations of the O-ring 8 in the circumferential direction. This ensures that the O-ring 8 is pressed into the ring-shaped groove between the side surface 61 of the mirror 6 and the mirror holder 7. Note that, the circumferential wall part 72 of the mirror holder 7 is designed so that the O-ring 8 can be mounted in a suitably compressed form.

However, in mounting with the fingers of a worker, non-uniform pressing force may be applied to various parts of the O-ring 8 in the circumferential direction due low skill of the worker, and therefore the O-ring 8 is liable to be mounted in a slanted posture with respect to the mirror 6 or mirror holder 7. Alternatively, the O-ring 8 may stick out from the above ring-shaped groove because of manufacturing error of the mirror holder 7 and O-ring 8 or swelling of the O-ring 8 due to aging, and therefore the O-ring 8 is liable to be mounted slanted with respect to the mirror holder 7. If the O-ring 8 is mounted in a slanted posture in this way, the mirror 6 is liable to rise up from the mirror holder 7 due to the elastic recovery force of the O-ring 8.

FIG. 18 shows an O-ring 8 which is mounted in a posture slanted with respect to the mirror holder 7. In the state of FIG. 18, part of the O-ring 8 sticks out from the ring-shaped groove. As a result, the bottom surface 63 of the mirror 6 rises up from the mirror holder 7. Further, if the fingers of the worker mistakenly touch the mirror 6 during the mounting of the O-ring 8, the coating of the mirror 6 may be scratched or some contaminant may be deposited on the mirror 6. Further, if the worker repeatedly tries to mount the O-ring 8 with respect to the mirror 6 and mirror holder 7 in a horizontal posture, the mounting work of the O-ring 8 will take a longer time. Furthermore, if the pushing depth of the O-ring 8 into the above ring-shaped groove is insufficient, the O-ring 8 will stick out upward from the top surface 62 of the mirror 6, and thus obstruct cleaning of the top surface 62 to be performed afterward.

A mounting fixture which enables a worker to accurately mount an elastic seal member between an optical component and holder without directly touching the optical component has been sought.

SUMMARY OF INVENTION

According to a first aspect of the present invention, there is provided a mounting fixture used for mounting a ring-shaped elastic seal member between a ring-shaped side surface of an optical component and a holder which holds the optical component, comprising a first abutting surface which can abut against a top surface of the optical component which intersects the side surface, a projecting part which is arranged so as to surround the first abutting surface and projects out from the first abutting surface in a direction vertical to the first abutting surface, and a second abutting surface which is provided at a front end of the projecting part and can abut against the elastic seal member.

According to a second aspect of the present invention, there is provided a mounting fixture in the first aspect, wherein the projecting part has a projecting height smaller than a height of the side surface of the optical component.

According to a third aspect of the present invention, there is provided a mounting fixture in the first or second aspect, further comprising a positioning part which is arranged so as to surround the second abutting surface and can abut against the holder, wherein the positioning part determines a mounting position of the elastic seal member in a height direction of the side surface by abutting against the holder.

According to a fourth aspect of the present invention, there is provided a mounting fixture in any one of the first to third aspects, wherein the projecting part comprises a plurality of parts which are arranged apart from each other so as to surround the first abutting surface.

According to a fifth aspect of the present invention, there is provided a mounting fixture in any one of the first to fourth aspects, wherein the mounting fixture includes two surfaces which face opposite directions from each other, and each of the two surfaces is provided with the first abutting surface, the projecting part, and the second abutting surface.

According to a sixth aspect of the present invention, there is provided a mounting fixture in the third aspect, wherein the positioning part projects out from the second abutting surface in a direction vertical to the second abutting surface, the second abutting surface can further abut against a top surface of another optical component which is larger than that optical component, and a front end of the positioning part in a projecting direction can further abut against another elastic seal member for the other optical component.

According to a seventh aspect of the present invention, there is provided a mounting fixture in any one of the first to sixth aspects, having the form of a polygon, wherein each of at least two surfaces of said polygon is provided with the first abutting surface, the projecting part, and the second abutting surface.

According to an eighth aspect of the present invention, there is provided a mounting fixture in any one of the first to seventh aspects, wherein the projecting part has a plurality of cutaway parts which are arranged apart from each other so as to surround the first abutting surface, and the plurality of cutaway parts are used for detaching the optical component which contacts the top surface of the first abutting surface.

According to a ninth aspect of the present invention, there is provided a mounting fixture in any one of the first to eighth aspects, wherein the elastic seal member is an O-ring.

These and other objects, features, and advantages of the present invention will become clearer with reference to the detailed description of an illustrative embodiment of the present invention which is shown in the mounted drawings.

DETAILED DESCRIPTION OF EMBODIMENTS

Figure 1:
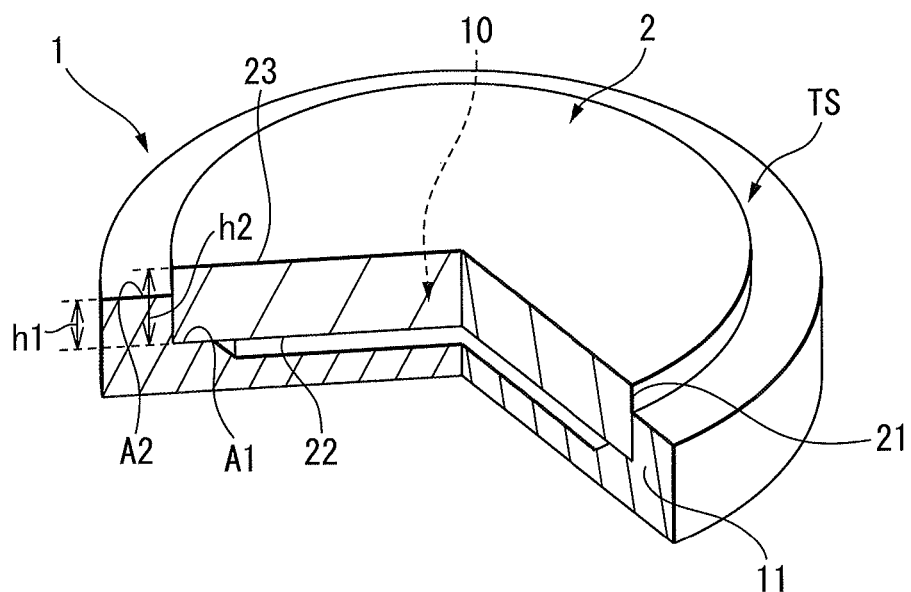
FIG. 1 is a partially cutaway perspective view of a mounting fixture according to one embodiment of the present invention.

Below, an embodiment of the present invention will be explained in detail with reference to the drawings. In the drawings, similar component elements are assigned similar reference notations. Note that the following explanation does not limit the technical scope of the inventions which are described in the claims or the meaning of terms etc.

Referring to FIG. 1 to FIG. 13, a mounting fixture of one embodiment of the present invention will be explained. The mounting fixture of the present embodiment is used to mount a ring-shaped elastic seal member to a ring-shaped side surface of an optical component. In particular, the mounting fixture of the present embodiment is used for mounting a ring-shaped elastic seal member between a side surface of various optical components to be built in a laser oscillator or laser processing machine etc. and a dedicated holder which holds such an optical component (see FIG. 3 to FIG. 5).

Figure 3:
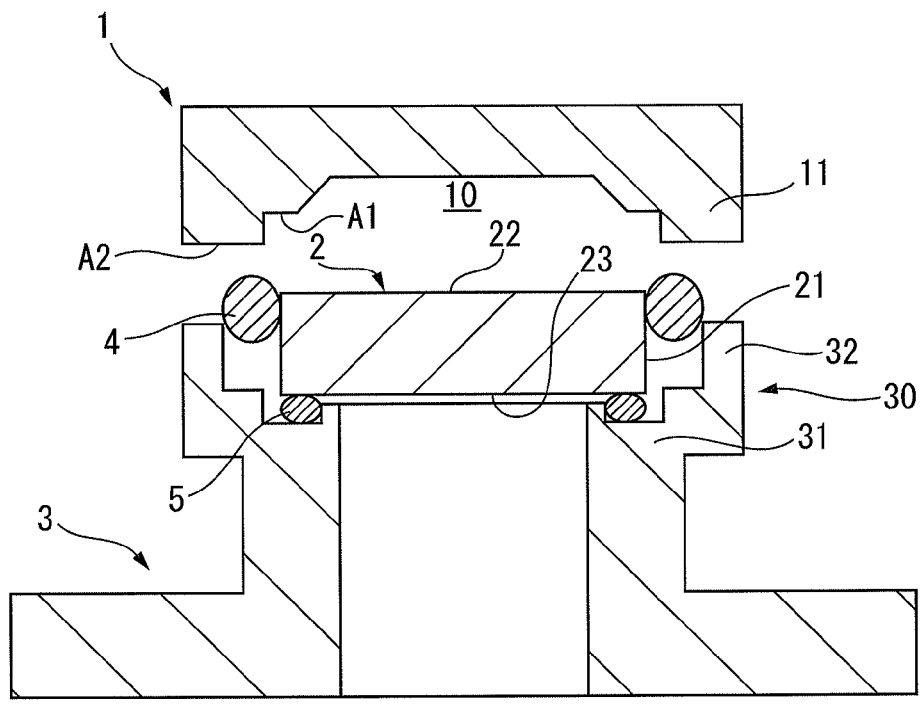
FIG. 3 is a second schematic view which shows by time series the procedure for mounting an elastic seal member for side surface, using the mounting fixture of FIG. 1.
Figure 4:
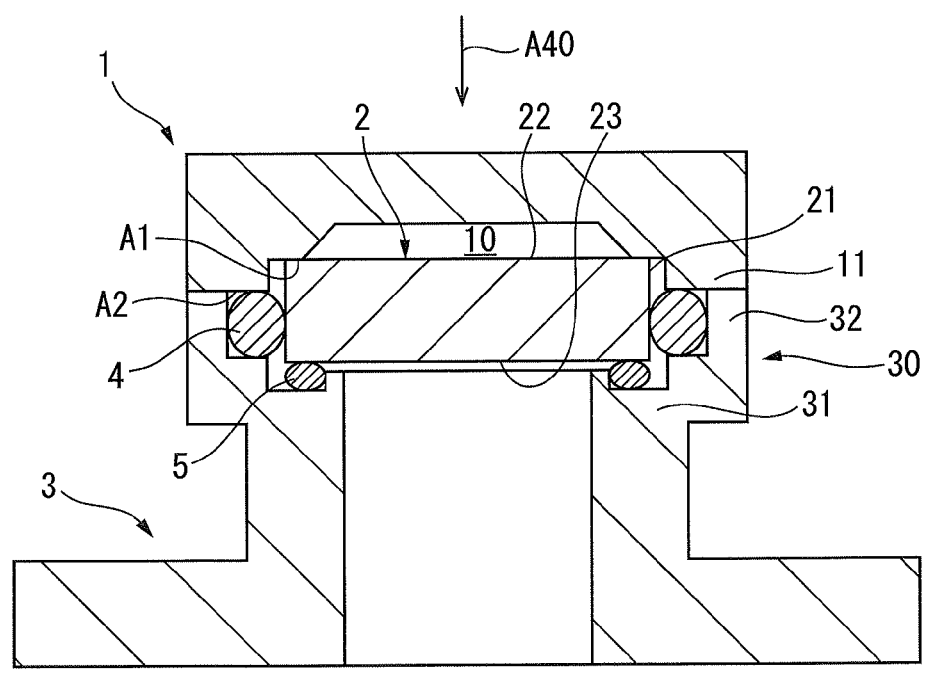
FIG. 4 is a third schematic view which shows by time series the procedure for mounting an elastic seal member for side surface, using the mounting fixture of FIG. 1.
Figure 5:
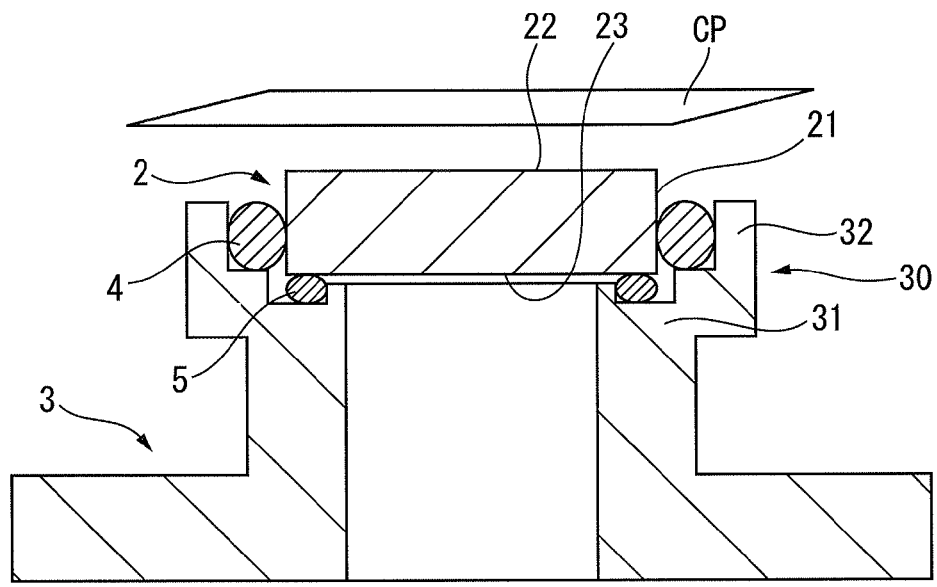
FIG. 5 is a fourth schematic view which shows by time series the procedure for mounting an elastic seal member for side surface, using the mounting fixture of FIG. 1.

FIG. 1 is a partially cutaway perspective view which shows an illustrative mounting fixture 1 of the present embodiment together with an optical component 2. The optical component 2 of the present example is a disk shaped optical component such as a partial reflecting mirror, full reflecting mirror, lens, etc., and has a side surface 21 which extends in a ring shape, and a top surface 22 and bottom surface 23 which intersect the side surface 21. Further, the elastic seal member to be mounted by the mounting fixture 1 of the present example is an elastic seal member which seals the ring-shaped groove between the side surface 21 of the optical component 2 and the dedicated holder which holds the optical component 2. Below, the elastic seal member to be mounted by the mounting fixture 1 will sometimes be referred to as the "elastic seal member for side surface" so as to be distinguished from other elastic seal members. FIG. 3 to FIG. 5 show the vertical cross-sectional surface of an illustrative elastic seal member 4 for side surface. The illustrative elastic seal member 4 for side surface of the present example is a plastic ring-shaped member such as an O-ring or gasket. However, the elastic seal member 4 for side surface may be any member so long as a ring-shaped member for seal use which has a suitable elasticity.

Here, before explaining the detailed structure of the mounting fixture 1 of FIG. 1, the structure of a dedicated holder for holding an optical component 2 will be explained. FIG. 3 to FIG. 5 show a vertical cross-sectional surface of an illustrative holder 3. As shown in FIG. 3 to FIG. 5, the holder 3 of the present example is a tubular member which has a top part 30 which holds an optical component 2. That top part 30 is provided with a ring-shaped support part 31 which supports the bottom surface 23 of the optical component 2. More specifically, the support part 31 of the holder 3 of the present example supports the bottom surface 23 of the optical component 2 by an elastic seal member 5 which is mounted there. Below, the elastic seal member 5 which supports the bottom surface 23 of the optical component 2 will sometimes be referred to as the "elastic seal member 5 for bottom surface" so as to be distinguished from the above-mentioned elastic seal member 4 for side surface. Further, the top part 30 of the holder 3 of the present example is provided with a tubular circumferential wall part 32 which is arranged to surround the support part 31 and which projects out upward from the support part 31. As shown in FIG. 4 and FIG. 5, the mounting fixture 1 of the present example is used for mounting an elastic seal member 4 between a side surface 21 of the optical component 2 which is placed on the support part 31 and the circumferential wall part 32. The specific method of use of the mounting fixture 1 will be explained later.

Referring to FIG. 1, the mounting fixture 1 of the present example has an overall shape of a disk which has two main surfaces facing opposite directions from each other. One main surface TS is provided with a circular shaped recess 10 which can hold just part of the optical component 2 in the thickness direction. That is, as shown in FIG. 1, if an optical component 2 is placed on the mounting fixture 1, only part of the optical component 2 in the thickness direction is held in the recessed part 10 of the mounting fixture 1. The remaining part of the optical component 2 is exposed to the outside of the recessed part 10. Further, the mounting fixture 1 of the present example has a first abutting surface A1 which can abut against the top surface 22 of the optical component 2. As shown in FIG. 1, the first abutting surface A1 is provided at the inside of the recessed part 10. Further, the first abutting surface A1 is configured so as to contact at least part of the top surface 22 of the optical component 2 and support the optical component 2 (see FIG. 4). The first abutting surface A1 in FIG. 1 has a continuous ring-shaped surface which is concentric with the circular recessed part 10, but in the mounting fixture 1 of the present embodiment, the first abutting surface A1 may also have another form. For example, the first abutting surface A1 may be a continuous surface which has another shape such as a circular or fan shape and may a plurality of discontinuous surfaces which are arranged along a circumferential direction of a circular recessed part 10.

Referring to FIG. 1, the mounting fixture 1 of the present example has a projecting part 11 which is arranged so as to surround the first abutting surface A1 and which projects out upward from the first abutting surface A1 in a direction vertical to the first abutting surface A1. As shown in FIG. 1, the projecting part 11 of the present example has the form of a tubular member which is arranged so as to surround the recessed part 10. Further, the mounting fixture 1 of the present example has a second abutting surface A2 which is provided at the front end of the projecting part 11 in the projecting direction and can abut against the elastic seal member 4 for side surface (see FIG. 4 as well). In FIG. 1, the second abutting surface A2 is a continuous ring shaped structure which is concentric with the first abutting surface A1. Therefore, when the second abutting surface A2 abuts against the elastic seal member 4, uniform pressing force is applied from the second abutting surface A2 to the elastic seal member 4 across the entire circumference of the elastic seal member 4. Therefore, it is possible to prevent the elastic seal member 4 from being mounted slanted with respect to the optical component 2 or holder 3. This will be explained further later.

Referring to FIG. 1, in the mounting fixture 1 of the present example, the projecting height (h1) of the projecting part 11 is smaller than the height (h2) of the side surface 21 of the optical component 2 (that is, h1<h2). The projecting height (h1) of the projecting part 11 herein means the dimension of the projecting part 11 in the direction vertical to the first abutting surface A1, that is, the height of the tubular member of the projecting part 11. Further, the height (h2) of the side surface 21 of the optical component 2 herein means the dimension of the side surface 21 in the direction vertical to the circumferential direction of the side surface 21, that is, the thickness of the side surface 21 of the optical component 2. If the projecting height (h1) of the projecting part 11 is smaller than the height (h2) of the side surface 21, the front end of the projecting part 11 can be prevented from sticking out beyond the optical component 2 which is placed on the first abutting surface A1. Therefore, according to the mounting fixture 1 of the present example, when the bottom surface 23 of the optical component 2 is wiped by cleaning paper, it is possible to prevent the cleaning paper from interfering with the mounting fixture 1 (see also FIG. 2). In this way, the mounting fixture 1 of the present example can exhibit not only the function as a mounting fixture for mounting an elastic seal member 4, but also a support fixture for supporting an optical component 2 during cleaning of the bottom surface 23.

Figure 2:
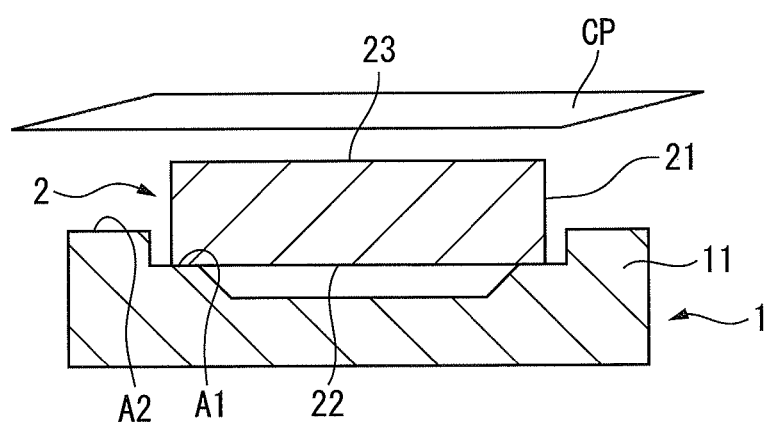
FIG. 2 is a first schematic view which shows by time series the procedure for mounting an elastic seal member for side surface, using the mounting fixture of FIG. 1.

Next, the method of use of the mounting fixture 1 of FIG. 1 will be explained. FIG. 2 to FIG. 5 are schematic views which show, by time series, the procedure for mounting the elastic seal member 4 for side surface, using the mounting mixture 1 of FIG. 1. First, in FIG. 2, the optical component 2 is detached from the holder 3 and placed on the mounting fixture 1. In the state of FIG. 2, the first abutting surface A1 of the mounting fixture 1 faces upward in the vertical direction. Further, the top surface 22 of the optical component 2 is placed on the first abutting surface A1 so that the bottom surface 23 of the optical component 2 faces upward in the vertical direction. After the mounting fixture 1 and the optical component 2 are brought into the states of FIG. 2, the bottom surface 23 of the optical component 2 is wiped by the cleaning paper CP. In this way, the mounting fixture 1 of the present example is also used for the purpose of supporting the optical component 2 during cleaning of the bottom surface 23.

Next, in FIG. 3, after cleaning of the bottom surface 23, the optical component 2 is again placed on the holder 3. In the state of FIG. 3, the elastic seal member 5 for bottom surface is already mounted between the bottom surface 23 of the optical component 2 and the holder 3. The elastic seal member 4 for side surface is provisionally fastened to the side surface 21 of the optical component 2. Next, in FIG. 4, the elastic seal member 4 for side surface is mounted by the mounting fixture 1 between the side surface 21 of the optical component 2 and the circumferential wall part 32 of the holder 3. During the transition from the state of FIG. 3 to the state of FIG. 4, the mounting fixture 1 moves in the direction of the arrow A40 in the figure so that the second abutting surface A2 abuts against the elastic seal member 4 for side surface from above.

After that, when the mounting fixture 1 moves further in the direction of the arrow A40, the elastic seal member 4 is pressed into the ring-shaped groove between the side surface 21 and the circumferential wall part 32 due to the pressing force from the second abutting surface A2. That is, the elastic seal member 4 slides downward along the side surface 21 of the optical component 2. The second abutting surface A2 is formed on the front end of the projecting part 11 which is arranged so as to surround the first abutting surface A1, and therefore a worker can apply a pressing force to various parts of the elastic seal member 4 in the circumferential direction just by moving the mounting fixture 1 toward the holder 3 (in direction of arrow A40). Therefore it is possible to prevent the elastic seal member 4 from being mounted in a slant posture with respect to the optical component 2 or holder 3.

After that, when the mounting fixture 1 moves further in the direction of the arrow A40, the peripheral edge part of the second abutting surface A2 abuts against the top end of the circumferential wall part 32 so that the mounting fixture 1 is stopped. The mounting work of the elastic seal member 4 is thus completed. Note that, the first abutting surface A1 abuts against the top surface 22 of the optical component 2 in the middle of the movement of the mounting fixture 1 in the direction of the arrow A4, and then the first abutting surface A1 supports the top surface 22 of the optical component 2. Therefore, it is possible to prevent the optical component 2 from rising up from the holder 2 in the middle of the mounting work of the elastic seal member 4.

Next, in FIG. 5, after the mounting work of the elastic seal member 4, the mounting fixture 1 is detached from the holder 3. In the state of FIG. 5, the elastic seal member 4 as a whole is positioned below the top surface 22 of the optical component 2, and therefore when the top surface 22 of the optical component 2 is wiped by cleaning paper CP, the cleaning paper CP will not interfere with the elastic seal member 4. In this way, according to the mounting fixture 1 of the present example, the top surface 22 can be cleaned after the elastic seal member 4 for side surface is mounted between the optical component 2 and the holder 3. Further, the elastic seal member 4 as a whole is positioned below the top surface 22 of the optical component 2, and therefore the cleaner used for cleaning the top surface 22 will never enter between the side surface 21 and elastic seal member 4.

Figure 6:
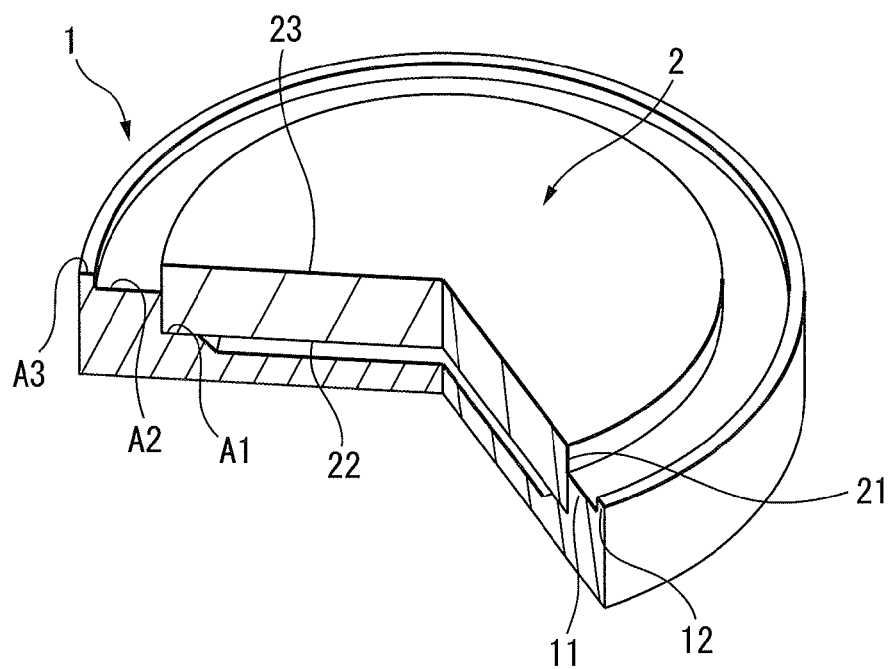
FIG. 6 is a partially cutaway perspective view similar to FIG. 1 which shows a first modification of a mounting fixture of the present embodiment.

Next, a modification of the mounting fixture 1 of the present embodiment will be explained. FIG. 6 is a partially cutaway perspective view, similar to FIG. 1, which shows a first modification of a mounting fixture 1 of the present embodiment. As shown in FIG. 6, the mounting fixture 1 of the present example has the above-mentioned first abutting surface A1, projecting part 11, and second abutting surface A2 plus a positioning part 12 which is formed on the front end of the projecting part 11. The positioning part 12 of the present example is arranged so as to surround the second abutting surface A2 and sticks out from the second abutting surface A2 in the direction vertical to the second abutting surface A2. As shown in FIG. 6, the positioning part 12 of the present example is a tubular member which sticks out further from the front end of the projecting part 11. Further, the front end of the positioning part 12 in the projecting direction of the present example is provided with a third abutting surface A3 which can abut against the top end of the circumferential wall part 32 of the holder 3.

That is, in mounting work with the mounting fixture 1 of the present example, the third abutting surface A3 of the positioning part 12 abuts against the holder 3 so as to determine the stopping position of the mounting fixture 1 with respect to the holder 3, and thus the mounting position of the elastic seal member 4 with respect to the optical component 2 and holder 3. Therefore, according to the mounting fixture 1 of the present example, it is possible to freely adjust the mounting position of the elastic seal member 4 with respect to the optical component 2 and holder 3 by suitably setting the position of the third abutting surface A3 with respect to the second abutting surface A2 (that is, by suitably setting the projecting height of the positioning part 12). In this way, according to the mounting fixture 1 of the present example, it is possible to achieve the optimum mounting position of the elastic seal member 4 in accordance with the dimensions of the optical component 2 or shape of the holder 3 etc.

Figure 7:
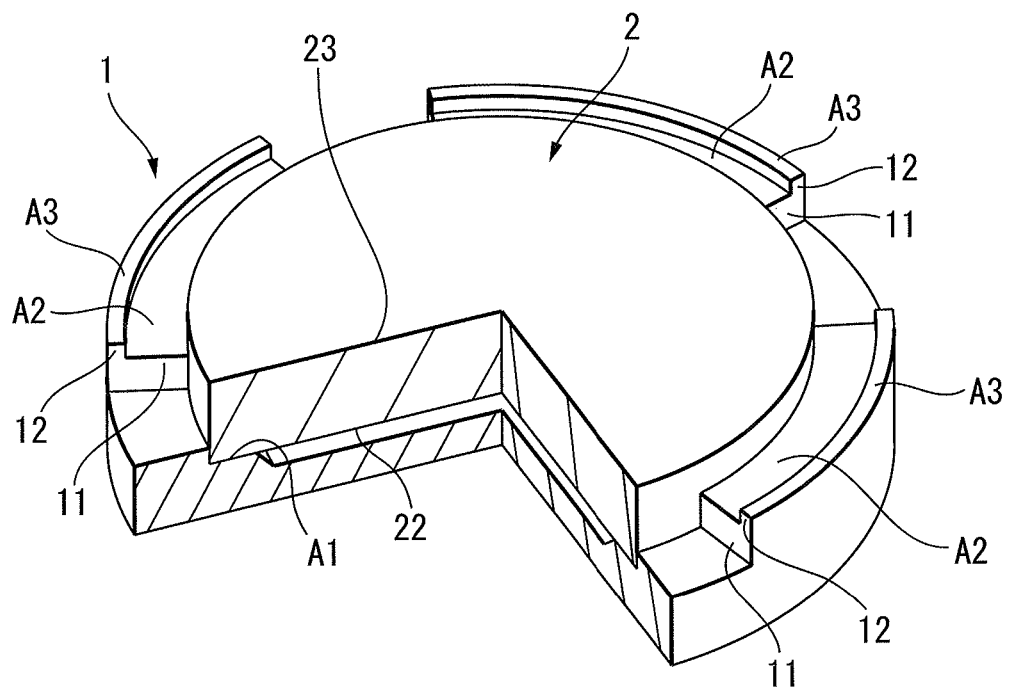
FIG. 7 is a partially cutaway perspective view similar to FIG. 6 which shows a second modification of a mounting fixture of the present embodiment.

FIG. 7 is a partially cutaway perspective view, similar to FIG. 6, which shows a second modification of the mounting fixture 1 of the present embodiment. The mounting fixture 1 of the present example, in the same way as the mounting fixture 1 of FIG. 6, has the positioning part 12 and third abutting surface A3, in addition to the first abutting surface A1, projecting part 11, and second abutting surface A2. However, the projecting part 11 of the present example comprises a plurality of parts which are arranged apart from one another so as to surround the first abutting surface A1 while the projecting part 11 in FIG. 6 is a single tubular member. More specifically, the projecting part 11 of the present example comprises four parts which are arranged at equal intervals so as to surround the first abutting surface A1 (however, only three parts are visible in FIG. 7). Further, the positioning part 12 and the third abutting surface A3 of the present example are provided at each of the plurality of parts which form the projecting part 11.

That is, the second abutting surface A2 according to the present example is not one continuous surface such as those in the examples of FIG. 1 and FIG. 6, but comprises a plurality of discontinuous surfaces which are separated from each other. In this case as well, the second abutting surface A2 is arranged so as to surround the first abutting surface A1 as a whole, and therefore a worker can apply substantially uniform pressing force to various parts of the elastic seal member 4 in the circumferential direction by merely moving the mounting fixture 1 toward the holder 3. Further, according to the structure of the projecting part 11 of the present example, during the mounting work of the elastic seal member 4, the worker can view the optical component 2 through the above plurality of parts. That is, according to the mounting fixture 1 of the present example, it is possible to improve visibility of the optical component 2, and thus simplify the mounting work of the elastic seal member 4.

Figure 8:
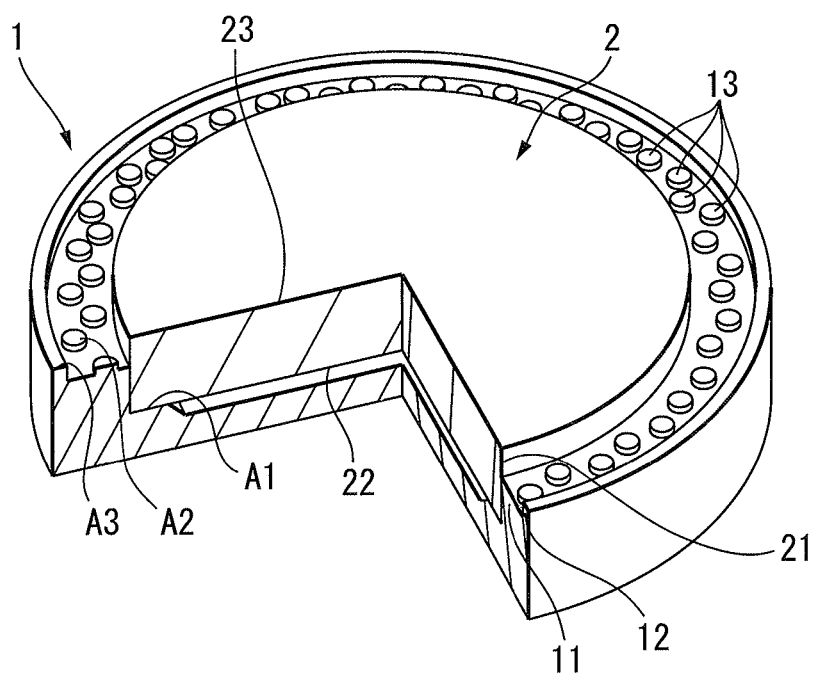
FIG. 8 is a partially cutaway perspective view similar to FIG. 6 which shows a third modification of a mounting fixture of the present embodiment.

FIG. 8 is a partially cutaway perspective view, similar to FIG. 6, which shows a third modification of the mounting fixture 1 of the present embodiment. Like the mounting fixture 1 of FIG. 6, the mounting fixture 1 of the present example has the positioning part 12 and third abutting surface A3, in addition to the first abutting surface A1, projecting part 11, and second abutting surface A2. However, the second abutting surface A2 according to the present example is formed of the front end surfaces of a large number of projections which stick out further from the front end of the projecting part 11 while the second abutting surface A2 in FIG. 6 is formed of a single continuous ring surface. The large number of projections 13 in FIG. 8 are arranged substantially evenly along the circumferential direction of the tubular member of the projecting part 11. In this case as well, the second abutting surface A2 is arranged as a whole to surround the first abutting surface A1, and therefore the worker can apply substantially uniform pressing force to various parts of the elastic seal member 4 in the circumferential direction by merely moving the mounting fixture 1 toward the holder 3.

Figure 9:
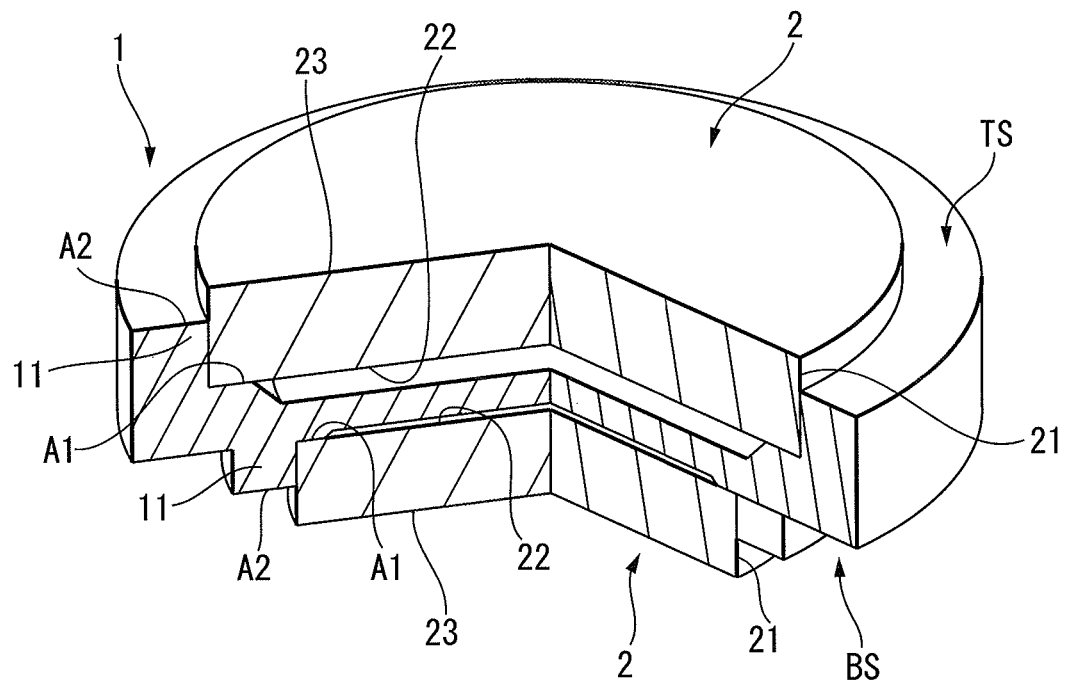
FIG. 9 is a partially cutaway perspective view similar to FIG. 1 which shows a fourth modification of a mounting fixture of the present embodiment.

FIG. 9 is a partially cutaway perspective view, similar to FIG. 1, which shows a fourth modification of the mounting fixture 1 of the present embodiment. Like the mounting fixture 1 of FIG. 1, the mounting fixture 1 of the present example has the overall shape of a disk which has two main surfaces facing opposite directions from each other. However, first abutting surfaces A1, projecting parts 11, and second abutting surfaces A2 are provided at the two main surfaces TS and BS in the mounting fixture 1 of the present example, while the first abutting surface A1, projecting part 11, and second abutting surface A2 are provided at only one main surface TS in the mounting fixture of FIG. 1. Below, one combination of the first abutting surface A1, projecting part 11, and second abutting surface A2 will sometimes be referred to collectively as a "mounting structure". In the mounting fixture 1 of the present example, the mounting structures of the respective main surfaces TS and BS are preferably configured to mount elastic seal members 4 to optical components 2 with dimensions different from each other.

For example, the mounting structure on one main surface TS (that is, the combination of the first abutting surface A1, projecting part 11, and second abutting surface A2) is configured so as to mount an elastic seal member 4 to an optical component 2 with a diameter of 1.5 inch (about 3.8 cm). The mounting structure of the other main surface BS is configured to mount an elastic seal member 4 to an optical component 2 with a diameter of 1.1 inch (about 2.8 cm). In this way, in the mounting fixture 1 of the present example, mounting structures for the mounting work of the elastic seal members 4 (that is, the combination of the first abutting surface A1, projecting part 11, and second abutting surface A2) are provided at both surfaces of the disk, and therefore it is possible to mount elastic seal members 4 to two types of optical components 2, using a single mounting fixture 1.

Figure 10:
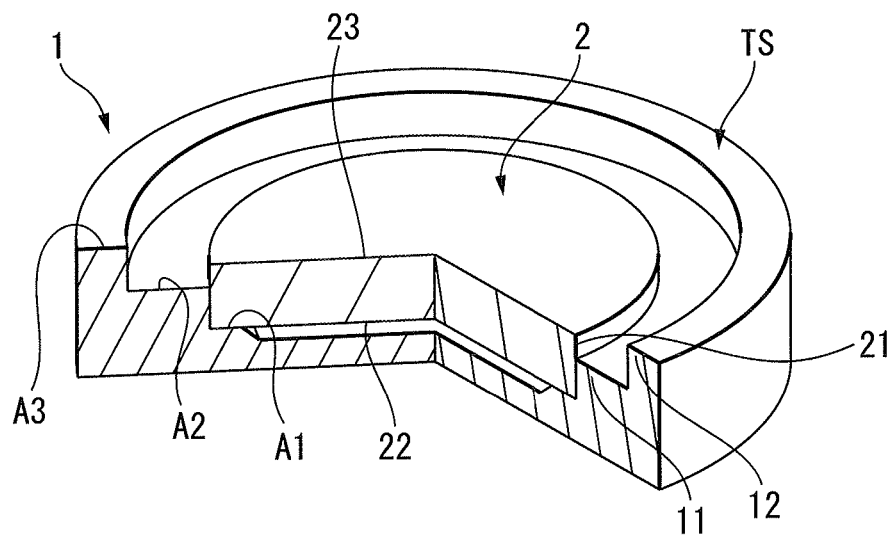
FIG. 10 is a partially cutaway perspective view similar to FIG. 6 which shows a fifth modification of a mounting fixture of the present embodiment.

FIG. 10 is a partially cutaway perspective view, similar to FIG. 5, which shows a fifth modification of the mounting fixture 1 of the present embodiment. In the same way as the mounting fixture 1 of FIG. 6, the mounting fixture 1 of the present example has a positioning part 12 and a third abutting surface A3, in addition to a first abutting surface A1, projecting part 11, and second abutting surface A2. As explained above, the first abutting surface A1 can abut against the top surface 22 of the optical component 2. More specifically, the first abutting surface A1 in FIG. 10 can abut against the top surface 22 of an optical component 2 with a diameter of 1.1 inch (about 2.8 cm). Further, the second abutting surface A2 can abut against the elastic seal member 4 for side surface of the optical component 2 (omitted in FIG. 10), and the third abutting surface A3 can abut against the circumferential wall part 32 of the holder 3 (omitted in FIG. 10).

Figure 11:
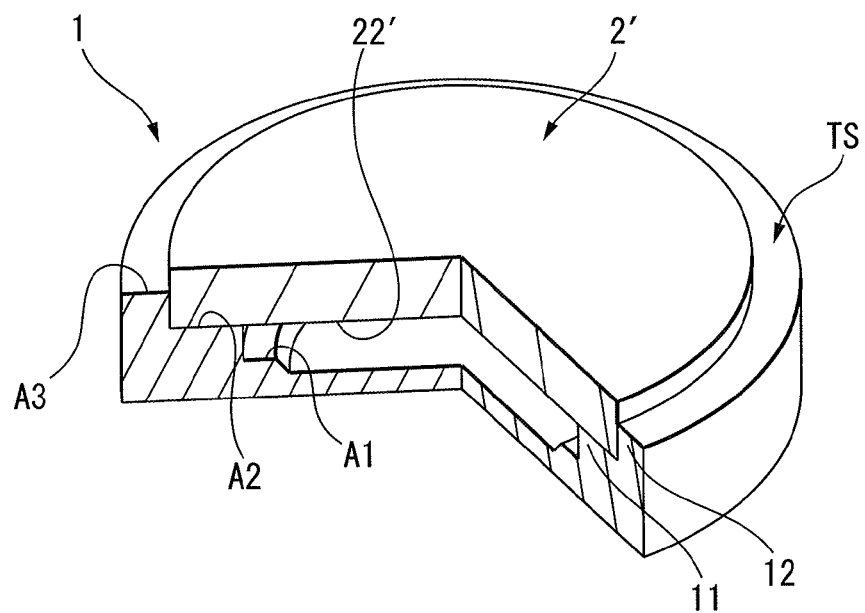
FIG. 11 is another partially cutaway perspective view which shows a mounting fixture of FIG. 10.

FIG. 11 is another partially cutaway perspective view which shows a mounting fixture 1 of FIG. 10. As shown in FIG. 11, the second abutting surface A2 according to this example can also abut against the top surface 22' of another optical component 2' which is larger than the above optical component 2. That is, the second abutting surface A2 in FIG. 10 and FIG. 11 can abut against not only the elastic seal member 4 for side surface for an optical component 2 with a diameter of 1.1 inch (about 2.8 cm), but also the top surface 22' of another optical component 2' with a diameter of 1.5 inch (about 3.8 cm). Further, the third front end surface A3 of the present example can also abut against the elastic seal member for side surface for the other optical component 2'. That is, the third abutting surface A3 in FIG. 10 and FIG. 11 can abut against not only the circumferential wall part 32 of the holder 3, but also the elastic seal member for side surface (omitted in FIG. 11) for the optical component 2' with a diameter of 1.5 inch (about 3.8 cm).

As will be understood from FIG. 10 and FIG. 11, in the mounting fixture 1 of the present example, the combination of the first abutting surface A1, the projecting part 11, and the second abutting surface A2 functions as the first mounting structure, and the combination of the second abutting surface A2, positioning part 12, and third abutting surface A3 functions as the second mounting structure. In this way, the mounting fixture 1 of the present example has two mounting structures in the same way as the example of FIG. 9, but these mounting structures are provided at the same main surface TS of the disk, unlike the example of FIG. 9. Therefore, according to the mounting fixture 1 of the present example, it is possible to mount elastic seal members 4 to two types of optical components 2 using a single mounting fixture, and thus possible to simplify the overall shape of the mounting fixture 1.

Figure 12:
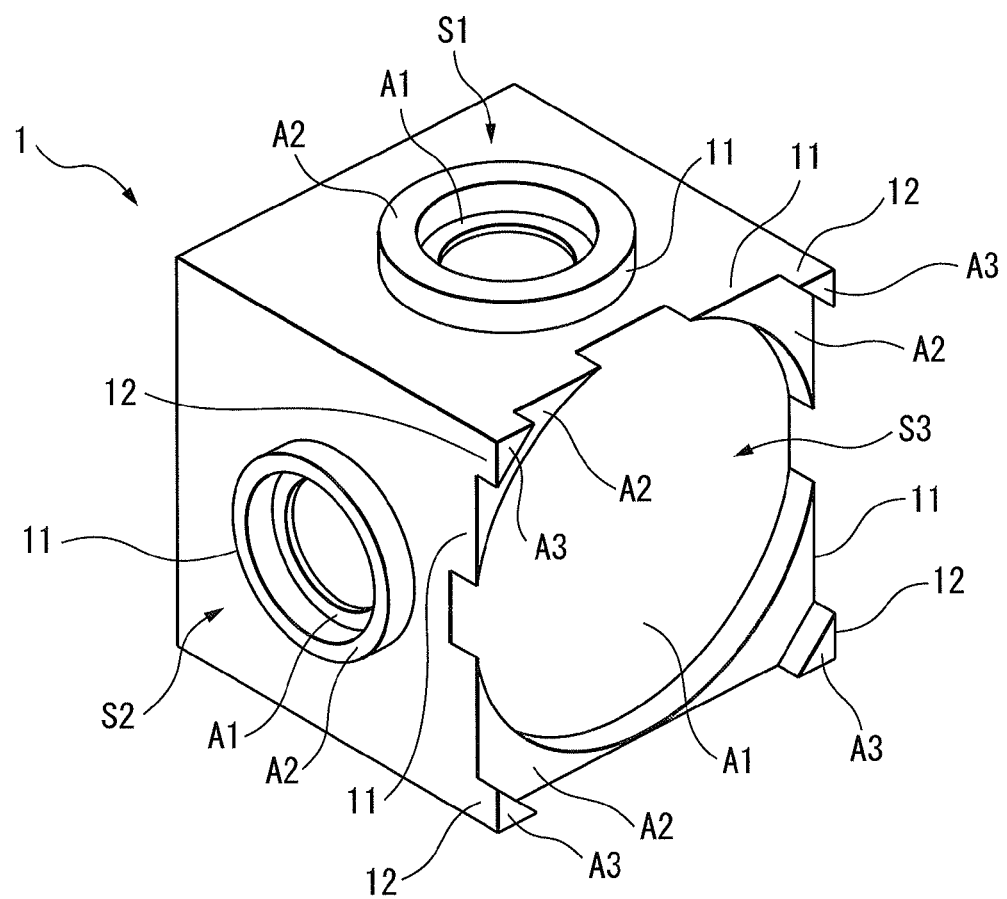
FIG. 12 is a perspective view which shows a sixth modification of a mounting fixture of the present embodiment.

FIG. 12 is a perspective view which shows a sixth modification of a mounting fixture 1 of the present embodiment. The mounting fixture 1 of the present example has an overall shape of a polygon which has a plurality of surfaces, unlike the mounting fixture 1 of FIG. 1 which has an overall shape of a disk. More specifically, the mounting fixture 1 of FIG. 12 has the overall shape of a hexagon which has six surfaces. Further, in the mounting fixture 1 of the present example, a mounting structure used for the mounting work of an elastic seal member 4 (that is, the combination of the first abutting surface A1, the projecting part 11, and the second abutting surface A2) is provided at each of at least two surfaces of the polygon. More specifically, in the mounting fixture 1 of FIG. 12, a mounting structure is provided at each of the three surfaces S1, S2, and S3 of the hexagon. The mounting structures on the respective surfaces of the hexagon are preferably configured so as to mount elastic seal members 3 to optical components with dimensions different from each other.

For example, the mounting structure on the first surface S1 of the hexagon (that is, the combination of the first abutting surface A1, projecting part 11, and second abutting surface A2) is configured to mount an elastic seal member 4 to an optical component 2 with a diameter of 1.1 inch (about 2.8 cm). On the other hand, the mounting structure on the second surface S2 of the hexagon is configured to mount an elastic seal member 4 to an optical component 2 with a diameter of 1.5 inch (about 3.8 cm). Further, the mounting structure on the third surface S3 of the hexagon is configured so as to mount the elastic seal member 4 to an optical component 2 with a diameter 2.0 inch (about 5.1 cm). In this way, in the mounting fixture 1 of the present example, the mounting structures used for the mounting work of the elastic seal member 4 are provided at each of the plurality of surfaces S1, S2, and S3 of the polygon, and therefore it is possible to mount elastic seal members 4 to a plurality of types of optical components 2 using a single mounting fixture 1.

Note that, in the mounting fixture 1 of FIG. 12, only the projecting part 11 on the third surface S3 of the polygon comprises a plurality of parts, and the projecting parts 11 on the remaining surfaces S1 and S2 comprises single tubular members. However, the projecting parts 11 on all of these surfaces S1, S2, and S3 may also comprise pluralities of parts, and the projecting parts 11 on all of these surfaces S1, S2, S3 may also comprise single tubular members. Further, in the mounting fixture 1 of FIG. 12, the positioning part 12 and the third abutting surface A3 are provided only at the third surface S3 of the polygon, but the positioning part 12 and the third abutting surface A3 may also be provided at all of these surfaces S1, S2, and S3. Alternatively, the positioning part 12 and the third abutting surface A3 may not be provided at any of the surfaces of the polygon.

Figure 13:
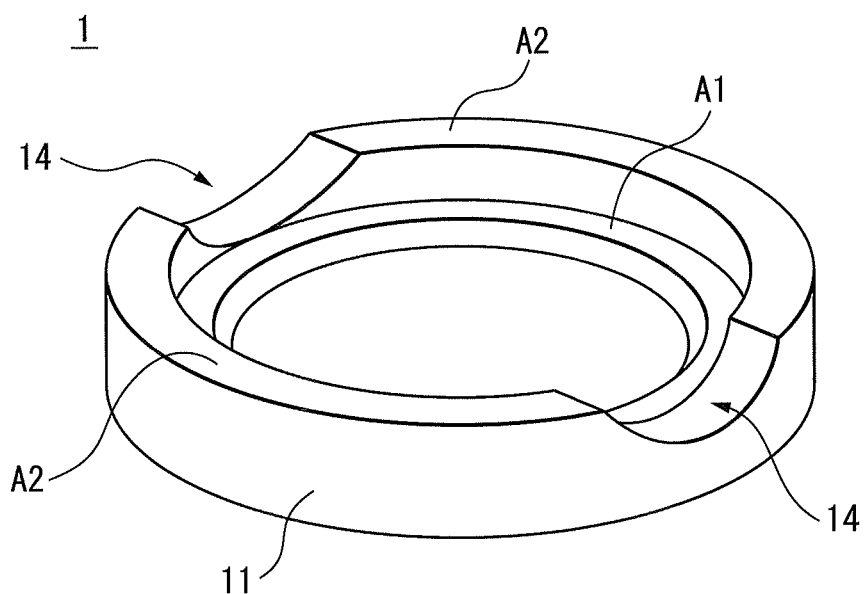
FIG. 13 is a perspective view which shows a seventh modification of a mounting fixture of the present embodiment.
Figure 14:
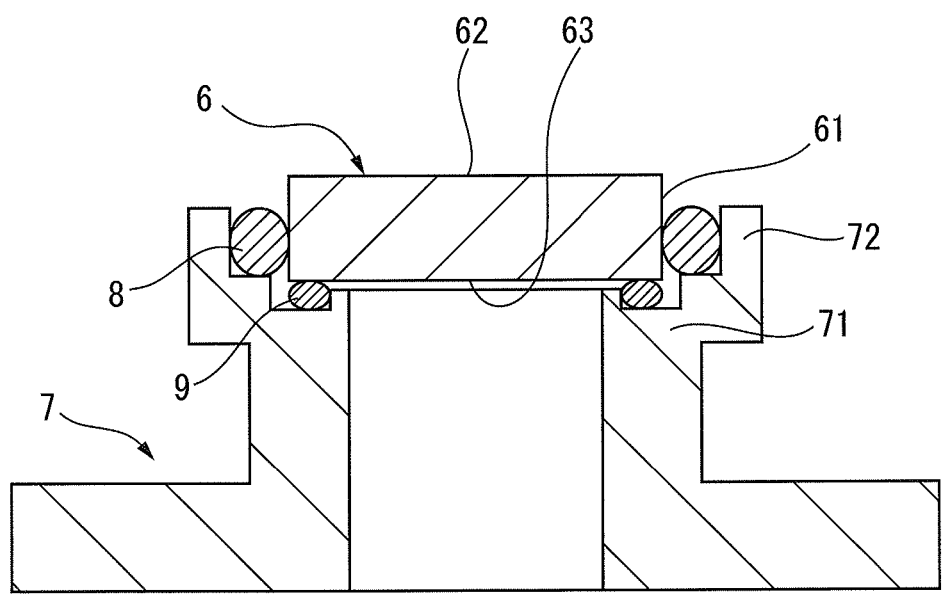
FIG. 14 is a first schematic view which shows by time series the procedure of mounting work of an optical component according to the prior art.
Figure 15:
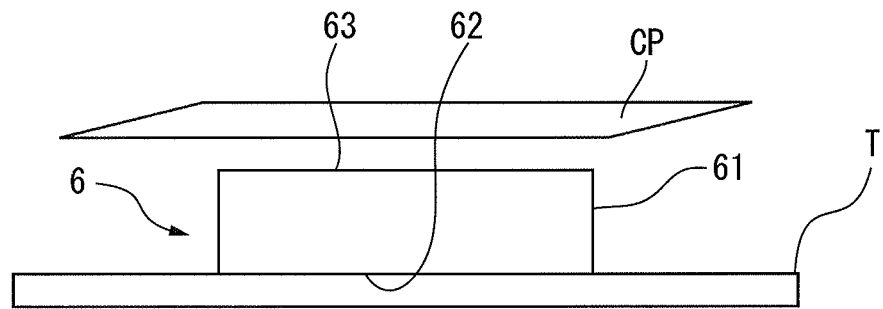
FIG. 15 is a second schematic view which shows by time series the procedure of mounting work of an optical component according to the prior art.
Figure 16:
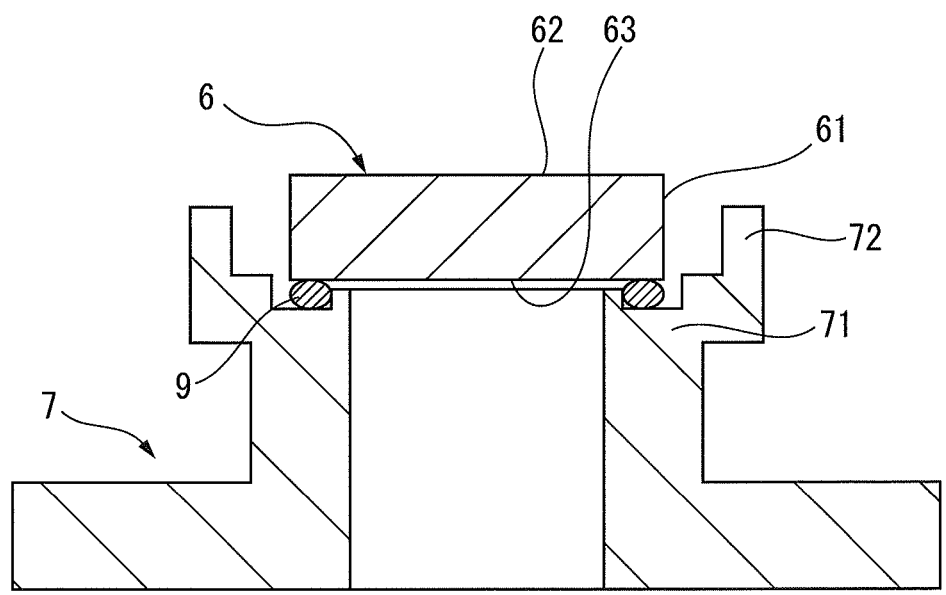
FIG. 16 is a third schematic view which shows by time series the procedure of mounting work of an optical component according to the prior art.
Figure 17:
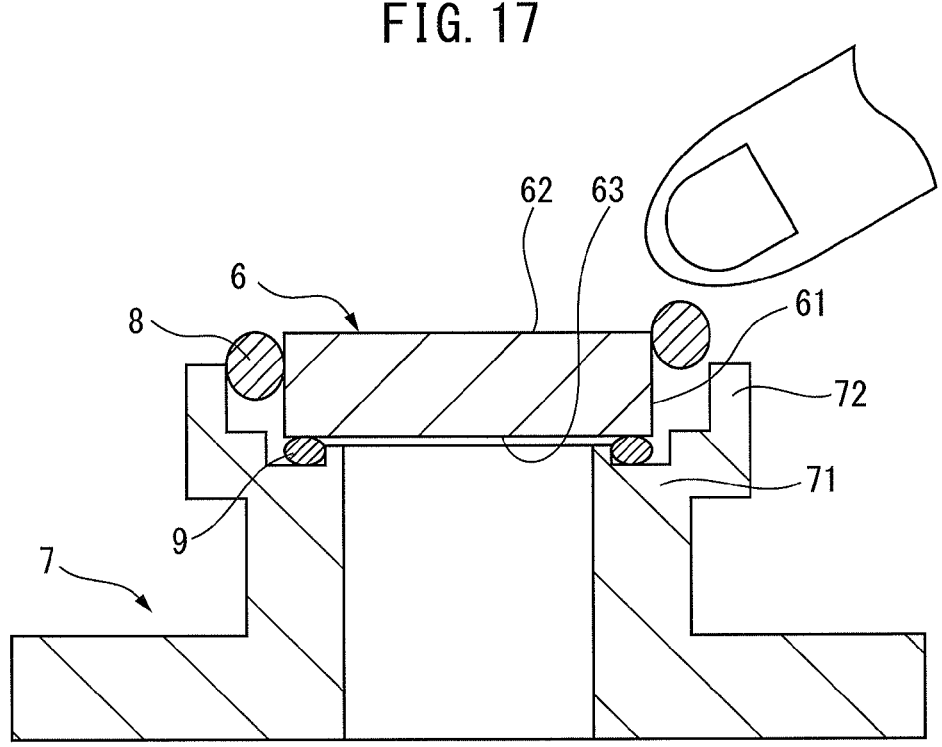
FIG. 17 is a fourth schematic view which shows by time series the procedure of mounting work of an optical component according to the prior art.
Figure 18:
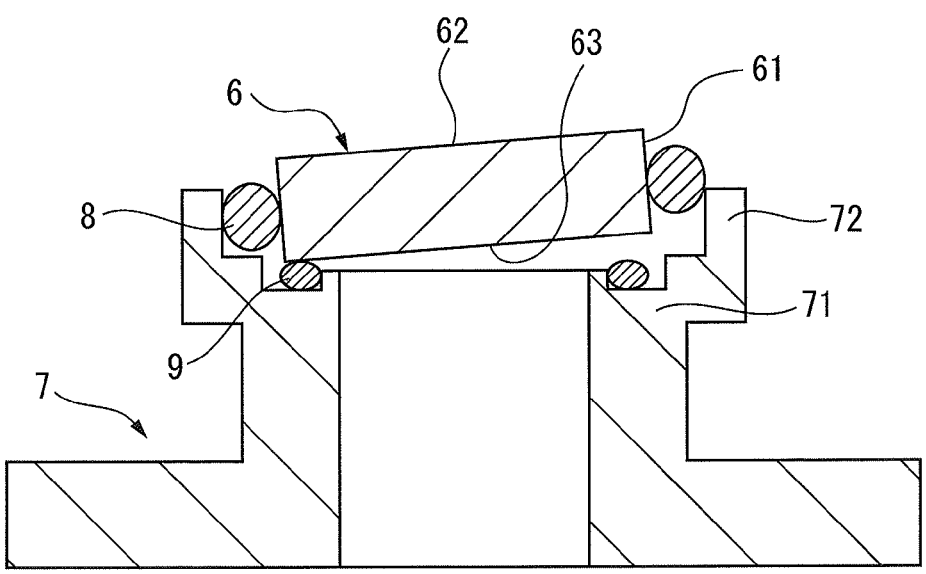
FIG. 18 is a fifth schematic view which shows by time series the procedure of mounting work of an optical component according to the prior art.

FIG. 13 is a perspective view which shows a seventh modification of a mounting fixture of the present embodiment. As shown in FIG. 13, the mounting fixture 1 of the present example has the above-mentioned first abutting surface A1, the projecting part 11, and the second abutting surface A2. Like the example of FIG. 1, the projecting part 11 of the present example has the form of a single tubular member which is arranged so as to surround the first abutting surface A1. Further, the projecting part 11 of the present example is provided with a plurality of cutaway parts 14 which are separated from each other in the circumferential direction of the tubular member. More specifically, the projecting part 11 in FIG. 13 is provided with two cutaway parts 14 which are arranged at equal intervals in the circumferential direction of the tubular body. These cutaway parts 14 respectively are sized and shaped so that the fingertips of a worker can be inserted therethrough.

The cutaway parts 14 of the present example are used by a worker for taking out an optical component 2 which contacts the top surface 22 of the first abutting surface A1 from the mounting fixture 1. That is, when the optical component 2 is placed on the mounting fixture 1 (see FIG. 2), the worker's fingertips can reach the side surface 21 of the optical component 2 through the cutaway parts 14, and therefore the worker can easily grip the side surface 21 of the optical component 2. This ensures that the optical component 2 can easily be taken out from the mounting fixture 1 after cleaning of the above-mentioned bottom surface 23, and therefore it is possible to shorten the time required for the work for remounting the optical component 2 in the holder 3. Note that, as shown in FIG. 13, the second abutting surface A2 according to the present example comprises a plurality of discontinuous surfaces which are separated by cutaway parts 14. Further, the mounting fixture 1 of the present example further may also have the above-mentioned positioning part 12 and the third abutting surface A3, and in this case the positioning part 12 and the third abutting surface A3 are provided at each of the plurality of discontinuous surfaces which form the second abutting surface A2.

The method of using the mounting fixture of FIG. 6 to FIG. 13 is similar to the method of using the mounting fixture 1 of the above-mentioned FIG. 1 (see FIG. 2 to FIG. 5). Further, in the mounting fixture 1 of FIG. 6 to FIG. 13 as well, the second abutting surface A2 which can abut against the elastic seal member 4 is provided at the front end of the projecting part 11 which is arranged so as to surround the first abutting surface A1 which can abut against the top surface 22 of the optical component 2. Accordingly, a worker can apply uniform pressing force to various parts of the elastic seal member 4 in the circumferential direction by merely moving the mounting fixture 1 toward the holder 3, and therefore it is possible to prevent the elastic seal member 4 from being mounted in a posture slanted with respect to the optical component 2 or holder 3. That is, by using the mounting fixture 1 of FIG. 6 to FIG. 13, a worker can accurately mount an elastic seal member 4 between the side surface 21 of an optical component and a holder 3 without directly contacting the optical component 2.

Effect of Invention

According to the first and ninth aspects of the present invention, the second abutting surface which can abut against an elastic seal member is provided at the front end of the projecting part which is arranged so as to surround the first abutting surface which can abut against the top surface of the optical component. Accordingly, a worker can apply uniform pressing force to various parts of the elastic seal member in the circumferential direction by merely moving the mounting fixture toward the holder to be able to, and therefore it is possible to prevent the elastic seal member from being mounted by a posture slanted with respect to the optical component or holder. That is, according to the first and ninth aspects, a worker can accurately mount an elastic seal member between the side surface of an optical component and a holder without directly contacting the optical component. In particular, according to the ninth aspect, a worker can accurately mount an O-ring between the side surface of an optical component such as a mirror or lens and the holder without directly contacting the side surface of the optical component.

According to the second aspect of the present invention, it is possible to prevent the front end of the projecting part from sticking out beyond the optical component which is placed on the first abutting surface. Therefore, according to the second aspect, the mounting fixture can exhibit not only the function of a mounting fixture which mounts the elastic seal member, but also the function of a support fixture which supports the optical component during cleaning of the optical component.

According to the third aspect of the present invention, the positioning part abuts against the holder so as to determine the stopping position of the mounting fixture with respect to the holder, and thus the mounting position of the elastic seal member with respect to the optical component and holder. Therefore, according to the third aspect, by suitably setting the position of the abutting surface of the positioning part with respect to the second abutting surface, it is possible to freely adjust the mounting position of the elastic seal member with respect to the optical component and holder.

According to the fourth aspect of the present invention, during the mounting work of the elastic seal member, the worker can view the optical component through the gaps between the plurality of parts of the projecting part, and therefore it is possible to simplify the mounting work of the elastic seal member.

According to the fifth aspect of the present invention, the mounting structure used for the mounting work of the elastic seal member is provided at the both surfaces of the mounting fixture, and therefore it is possible to mount elastic seal members to two types of optical components using a single mounting fixture.

According to the sixth aspect of the present invention, the second abutting surface can further abut against the top surface of a larger size optical component, and the front end of the positioning part in the projecting direction can further abut against the elastic seal member for the larger size optical component. Therefore, according to the sixth aspect, it is possible to mount elastic seal members to two types of optical components using a single mounting fixture, and thus possible to simplify the overall shape of the mounting fixture.

According to the seventh aspect of the present invention, the mounting structure used for the mounting work of an elastic seal member is provided at least two surfaces of a polygon, and therefore it is possible to mount elastic seal members to a plurality of types of optical components using a single mounting fixture.

According to the eighth aspect of the present invention, when the optical component is placed on the first abutting surface, the fingertips of the worker can reach the optical component through the cutaway part, and therefore the worker can easily grip and take out the optical component.

The present invention is not limited to the above-mentioned embodiment and can be modified in various ways within the scope described in the claims. Therefore, the dimensions, shapes, materials, etc. of the mounting fixture 1, optical component 2, holder 3, and elastic seal member 4 which are described in the above embodiments are only an example. Various dimensions, shapes, materials, etc. can be employed to achieve the effects of the present invention.

The invention claimed is:

1. A mounting fixture used for mounting an O-ring between a ring-shaped side surface of an optical component and a holder which holds said optical component, comprising
   a first abutting surface configured to abut against a top surface of said optical component which intersects said side surface,
   a projecting part which is arranged so as to surround said first abutting surface and project out from said first abutting surface in a direction vertical to said first abutting surface, and
   a second abutting surface which is provided at a front end of said projecting part and configured to abut against a top portion of said O-ring to press said O-ring in the direction vertical to said first abutting surface in a position between the ring-shaped side surface of the optical component and the holder which is separate from the mounting fixture and holds said optical component,
   wherein said projecting part has a projecting height smaller than a height of said side surface of said optical component such that the second abutting surface, when abutted against the O-ring, is positioned below the top surface of the optical component and above a bottom surface of the optical component.

2. The mounting fixture according to claim 1, further comprising a positioning part which is arranged so as to surround said second abutting surface and can abut against said holder, wherein
   said positioning part determines a mounting position of said O-ring in a height direction of said side surface by abutting against said holder.

3. The mounting fixture according to claim 2, wherein
   said positioning part projects out from said second abutting surface in a direction vertical to said second abutting surface,
   said second abutting surface can further abut against a top surface of another optical component which is larger than said optical component, and
   a front end of said positioning part in a projecting direction can further abut against another O-ring for said other optical component.

4. The mounting fixture according to claim 1, wherein
   said projecting part comprises a plurality of parts which are arranged apart from each other so as to surround said first abutting surface.

5. The mounting fixture according to claim 1, wherein
   said mounting fixture includes two surfaces which face opposite directions from each other, and
   each of said two surfaces is provided with said first abutting surface, said projecting part, and said second abutting surface.

6. The mounting fixture according to claim 1, having the form of a polygon, wherein
   each of at least two surfaces of said polygon is provided with said first abutting surface, said projecting part, and said second abutting surface.

7. The mounting fixture according to claim 1, wherein
   said projecting part has a plurality of cutaway parts which are arranged apart from each other so as to surround said first abutting surface, and
   said a plurality of cutaway parts are used for detaching said optical component which contacts said top surface of said first abutting surface.

* * * * *